A. MOSELEY.
TRIAL FRAME.
APPLICATION FILED JUNE 24, 1914.
1,222,017.
Patented Apr. 10, 1917.
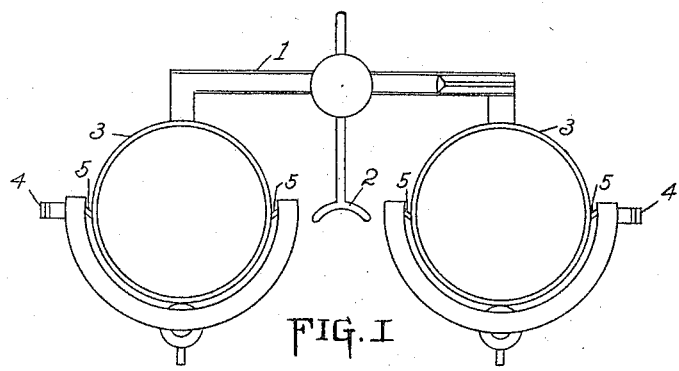
FIG. I
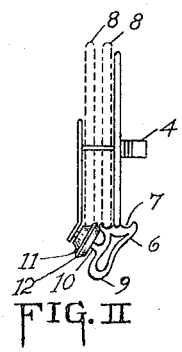
FIG. II
WITNESSES:
Joseph J. Demers
William N. Hurlbert
INVENTOR
ARNOLD MOSELEY
BY
H. H. Stytt, H. K. Parsons.
ATTORNEYS

UNITED STATES PATENT OFFICE.

ARNOLD MOSELEY, OF LONDON, ENGLAND.

TRIAL-FRAME.

1,222,017. Specification of Letters Patent. Patented Apr. 10, 1917.

Application filed June 24, 1914. Serial No. 847,134.

*To all whom it may concern:*

Be it known that I, ARNOLD MOSELEY, a subject of the King of England, residing at London, England, have invented certain new and useful Improvements in Trial-Frames, of which the following is a specification.

My invention relates to improvements in trial frame and has for its leading object the provision of an improved frame particularly adapted for use in testing for astigmatism.

A further object of my invention is the provision of simple, novel and inexpensive means whereby a cylindrical lens may be readily rotated within a trial frame.

A further object is the provision of improved means for automatically locking the cylindrical lens in desired adjusted position and for reducing to a minimum the liability of displacement of the axis thereof in removing and setting aside the testing frame.

Other objects and advantages of my improved construction should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a front elevation of one form of trial frame constructed in accordance with and embodying the principles of my invention, and Fig. II represents a side elevation thereof particularly illustrating my improvement.

In the drawings, the numeral 1 designates a bridge member which may be of any ordinary construction, and is preferably provided with a nose rest 2, while depending from the bridge member are the frame portions 3, bearing the temples or attaching devices 4 for securing the mounting in position upon the face of the wearer. Carried by each of the members 3 are a plurality of brackets 5 adapted to receive and hold in position a series of test rings or trial lenses as indicated in dotted lines in Fig. II.

In the testing of eyes it is necessary in addition to the regular spherical correction to determine whether there is any astigmatic effect present which should be corrected by the use of cylinders, and if any is present to determine the exact correct axis of the cylinder to be employed in making the said correction. A number of different ways have been tried out for attaining this result, among which may be mentioned the provision of a rack and gear for rotating one of the cells or the like. These devices, however, are all expensive to manufacture, render the cost of the frame itself quite high, and add considerably to the weight of the mounting, thus rendering the same liable to be uncomfortable for the person whose eyes are being tested.

It is the purpose of my present invention to provide a simple, inexpensive, yet practical and thoroughly efficient construction by which the cylindrical lenses may be readily rotated, and by which they will be automatically locked in desired position.

To attain this result I preferably secure to the frame member 3 at the bottom thereof the bracket member 6, having the recesses 7 to receive the rings or trial lenses 8, and having the depending foot 9 adapted to rest on the table or like surface. Projecting forwardly and upwardly at an angle from the bracket member 6 is the spindle 10, on which is mounted my improved device comprising a taper or cone hub 11 and a narrowed actuating portion 12.

The operation of my device will probably be best understood by reference to Fig. II, from which it will be seen that one of the trial lenses 8 rests partially against the portion 12 and partially against the tapered hub 11, the weight of the rings tending to slide the hub or device downwardly on its inclined spindle 10, thus wedging the same against the adjacent portion of the bracket. This will probably be best understood by reference to Fig. II, in which I have illustrated the rear upper edge of the actuating portion 12 as in frictional locked engagement with the adjacent portion of the bracket or frame. To rotate the ring 8 it is merely necessary to press against the narrowed portion 12 and rotate the ring, when the binding action of the hub against the trial ring or lens 8, on account of the inclination of the spindle 10 and of the hub will cause sufficient friction to firmly engage and cause the corresponding rotation of the ring 8 resting thereon, while the friction of the complete wheel on its spindle and the lens and the wedging action on account of the angle of inclination of the spindle will be sufficient to cause the wheel to bind and prevent its accidental rotation.

It is to be understood that this wheel may be of aluminum, or other similar material which will possess sufficient friction for the desired purpose, and at the same time be readily operable by pressure upward against the under side thereof, and it will further be understood that if desired I may coat the wheel with a rubber cement or other similar friction material to increase the surety of engagement between the wheel and the cylinder lens 8.

A further advantage of my construction is the provision of the foot 9 which projects below the lower edge of the wheel. This foot serves in connection with the temples 4 as a rest when the same is removed from the face, holding the wheels out of engagement with the table or desk and thus eliminating liability of rubbing of the wheels against the desk or table and consequent disarrangement of the cylinder lens as might otherwise be liable to occur.

From the foregoing description taken in connection with the drawings, the construction, operation and advantages of my improved trial frame should be readily apparent and it will be seen that I have provided a simple, inexpensive, light, durable and practical device in which the lens may be readily rotated without the provision of complicated mechanism and in which the lens will be satisfactorily held in desired rotatably adjusted position.

I claim:

1. The combination with a trial frame, of a bracket carried thereby, having notches to receive lenses, a foot portion formed on the bracket and depending to provide a rest, an inclined spindle formed on the bracket and projecting forwardly and upwardly therefrom, and a friction wheel mounted on the spindle in position to engage a lens, said wheel having a tapered hub for frictionally and wedgingly engaging the lens resting thereagainst, the length of the foot of the bracket being such as to hold the wheel out of engagement with the support for the frame, substantially as described.

2. The combination with a trial frame, of an inclined spindle carried thereby, a friction wheel rotatably mounted on the spindle, and an abutment adjacent the wheel, whereby pressure on the upper portion of the wheel will cause the same to slide downwardly on the spindle into frictional locking engagement with the abutment.

3. An attachment for a trial frame, comprising a rest, an inclined spindle carried by the rest, a friction wheel mounted on the spindle comprising an actuating rim, and a taper hub, and a friction coating for the taper hub to prevent slipping of a member in engagement therewith.

4. The combination with a trial frame, including a lens receiving guide and a spindle adjacent the guide, of a wheel rotatably mounted on the spindle and having a portion extending into the lens receiving space to engage the edge of the lens, and a friction coating for the wheel to prevent slipping of the lens when in engagement therewith.

5. The combination with a trial frame, of a bracket carried thereby and comprising a depending portion for engagement with a support, an inclined spindle integral with the bracket, a friction wheel rotatably mounted on the spindle and located out of engagement with the support, a bracket having a projecting portion above the spindle and disposed to frictionally engage and retard movement of the friction wheel on the spindle when the wheel is pressed toward the main portion of the bracket.

In testimony whereof I affix my signature in presence of two witnesses.

ARNOLD MOSELEY.

Witnesses:
 JAMES PRICE PETHERICK,
 HENRY MARION ANDREWS.

Copies of this patent may be obtained for five cents each, by addressing the "Commissioner of Patents, Washington, D. C."